United States Patent [19]

Johnson

[11] Patent Number: 5,094,579
[45] Date of Patent: Mar. 10, 1992

[54] FASTENER AND GROMMET ASSEMBLY PROVIDING AXIAL PLAY

[76] Inventor: H. Thad Johnson, 9339 Hilda La., Flushing, Mich. 48433

[21] Appl. No.: 600,442

[22] Filed: Oct. 19, 1990

[51] Int. Cl.$^5$ .................. F16B 21/18; F16B 39/00
[52] U.S. Cl. ........................ 411/107; 411/45; 411/108; 411/353; 411/970; 411/999
[58] Field of Search ............ 411/45, 41, 48, 103–105, 411/107, 108, 352, 353, 970, 999, 182

[56] References Cited

U.S. PATENT DOCUMENTS

| | | | |
|---|---|---|---|
| 3,126,935 | 3/1964 | Tuozzo | 411/352 |
| 4,732,519 | 3/1988 | Wagner | 411/107 |
| 4,890,966 | 1/1990 | Umezawa | 411/182 |
| 4,952,107 | 8/1990 | Dupree | 411/107 |

Primary Examiner—Neill R. Wilson
Attorney, Agent, or Firm—Gifford, Groh, Sprinkle, Patmore and Anderson

[57] ABSTRACT

A threaded fastener and grommet assembly for joining two apertured parts. The fastener is retained in the grommet with axial play between the fastener and grommet. The assembly can also be retained in one of the apertured parts, and when this part is placed over the other apertured part, the axial play allows alignment of the fastener without ejection of the assembly.

7 Claims, 1 Drawing Sheet

FASTENER AND GROMMET ASSEMBLY PROVIDING AXIAL PLAY

BACKGROUND OF THE INVENTION

1. Field of the Invention

This invention relates to a fastener and resilient grommet assembly for joining apertured work pieces. More particularly this invention relates to a bolt and rubber grommet assembly which allows relative movement or axial play between the bolt and grommet while retaining the bolt in the grommet.

2. Description of the Prior Art

There are a wide variety of fastener assemblies which combine a threaded fastener with a grommet or washer or both. The grommet is normally used for vibration isolation and sometimes to perform a sealing function. The washer protects the surface of one of the parts being joined or protects against the grommet being destroyed when the fastener is driven into the work or parts being joined. Grommets are typically retained on the shank of the screw or bolt by an elastic stretching, and a washer may be captured between the fastener head and the grommet. Washers can be retained independently of a grommet by keys or snapping a projection over a bead, rim, flange or the like. Pressing a metal washer over the shank of a metal fastener requires considerable force and is usually done in a press. In some instances, a forging, crimping, flaring or similar production step is utilized in retaining the washer. These assembly and post-assembly operations can add considerable expense to the fastener assembly which must be balanced against the ease in which the assembly is used in its intended joining function.

With the above-mentioned fastener assemblies, there is normally no need to provide anything more than a degree of radial play between the fastener and washer or grommet to satisfy a typical end use joining of parts. Consideration of providing axial movement or play between the fastener assembly parts is normally not needed. Likewise, providing means for retaining the fastener assembly on one of the parts to be joined is not a factor. However, with the increasing prevalence in the industry for producing and shipping preassembled subassemblies, particularly in the automotive field, the need for such retention and axial play features is becoming more apparent.

In prior art attempts to provide a fastener assembly which can be secured to one of the parts to be joined and which allows axial play or retractable movement of the fastener, metal standoff bushings have been used. Rubber grommets are either squeezed into the interior of the bushing or stretched over the exterior of the bushing as shown in U.S. Pat. Nos. 3,126,935 and 4,732,519 respectively. Both of these structures require flaring of the bushing for retention to one of the parts being joined. See, for example, FIG. 4 of U.S. Pat. No. 3,126,935, where a flaring tool is used on one side of the part in conjunction with a backup tool on the other side of the part. Considerable force must also be used in the fastener assembly of U.S. Pat. No. 4,732,519 to force the projections or wings on the bolt shank past the annular bead on the stand off bushing. Neither of these structures provide sealing of the bolt shank to the part aperture.

SUMMARY OF THE INVENTION

The present invention provides a fastener and grommet assembly with axial play for assembling apertured parts. The fastener and grommet can be shipped as an assembly usually with a flat washer on the fastener shank between the grommet and the fastener head without fear of separation. The fastener and grommet assembly can be installed on one of the apertured parts, also without concern that the fastener assemblies might be accidently separated from the part during shipment, even in an inverted position. Also, when the part containing the fastener assembly is placed on the other threaded part to which it is to be joined, even with a drop, the fastener assemblies will be retained in the first part. The axial play coupled with normal radial play allows the fasteners to be aligned for the final tightening process.

The fastener assembly of this invention provides a seal between the fastener and grommet and between the apertured part and the grommet so that it can be used where the gasket or bead seal is inside or outside of the fastener perimeter, for example, in attaching a rocker arm cover or oil pan to an engine cylinder head. The assembly also provides torque limiting when the fasteners are being driven in joining the parts. This assures proper compression of the bead seal or gasket.

The fastener assembly includes a bolt having a head with a bearing surface below the head. The shank of the bolt has spaced upper and lower shoulders with a reduced diameter relief area between the two shoulders. The upper shoulder is adjacent to the bearing surface. The bolt threads are located on the shank below the lower shoulder. The other primary element of the combination is a resilient grommet which has an upper and lower spaced flange with an intermediate tubular portion which interconnects the flanges. The upper flange has a free radial face. A through-hole in the grommet receives the shank of the bolt therethrough. A bead adjacent the radial face projects inwardly in the through-hole. The lower bolt shoulder has an outside diameter larger than the inside diameter of the bead so that the lower bolt shoulder must be forced past the bead as the bolt is being inserted into the grommet. The coaction of the lower shoulder and the bead acts as a stop retaining the bolt in the grommet. In a preferred form of the invention, a flat washer is located on the bolt shank between the bearing surface and the free radial face of the grommet upper flange. The inner diameter of the bead is larger than the reduced diameter of the relief area. Substantial axial play is provided between the grommet and bolt for alignment of the apertured parts being joined. The play is defined between a position where the bearing surface is in contact with the washer and an extended position where the lower flange contacts the bead.

In a preferred embodiment of the invention, the grommet bead has an interference fit with the upper flange on the bolt shank so as to become a sealing ring when the bolt is fully inserted into the grommet.

In another preferred embodiment of the invention, the through-hole in the grommet has a reduced diameter adjacent its lower end creating an interference fit with the lower bolt shoulder so that when the fastener and grommet assembly is inserted into an aperture on a wall of an apertured part, the wall will be located on the tubular portion between the upper and lower flanges of the grommet, and when the bolt is fully inserted into the grommet, the lower bolt shoulder will expand the lower grommet flange outwardly to enhance retention of the assembly on the apertured part.

Preferably, the upper and lower flanges of the grommet are circumferentially continuous with the upper surface of the lower flange constituting a radial stop surface extending from the outer periphery of the flange towards the tubular portion. The flange has an exterior surface which tapers from the outer periphery or perimeter of the flange inwardly to a free end of the flange. This tapering exterior surface of the lower flange aids in the insertion of the assembly into the aperture of the apertured part, and the radial stop surface of the lower grommet flange will coact with a step in the part aperture to retain the grommet, and hence the fastener and grommet assembly on the apertured part.

In still another perferred embodiment of the invention, the lower bolt shoulder has a lower radial face which is spaced a selected distance from the bearing surface below the bolt head and the thickness of the washer is selected so that when the apertured part to which the fastener assembly has been attached is being joined to a second part having a threaded aperture by driving the bolts into the threaded apertures, this lower surface constitutes a torque limiting surface.

DRAWING

Other features and advantages of the fastener and grommet assembly of this invention will be apparent from the detailed description taken in conjunction with the accompanying drawings in which.

Figure 2:
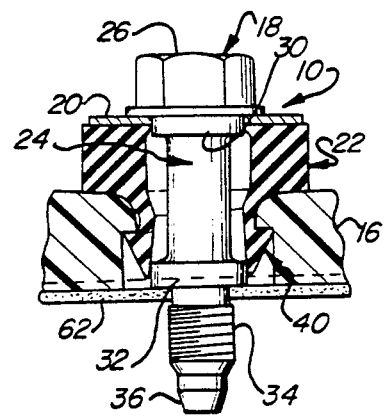
FIG. 2 is a cross-sectional view showing the fastener and grommet assembly attached through an aperture in a rocket arm cover with the bolt fastener in its fully inserted position so that a lower shoulder on the bolt shank causes outward plastic expansion of the lower flange of the grommet to increase the retention of the assembly on the cover.
Figure 3:
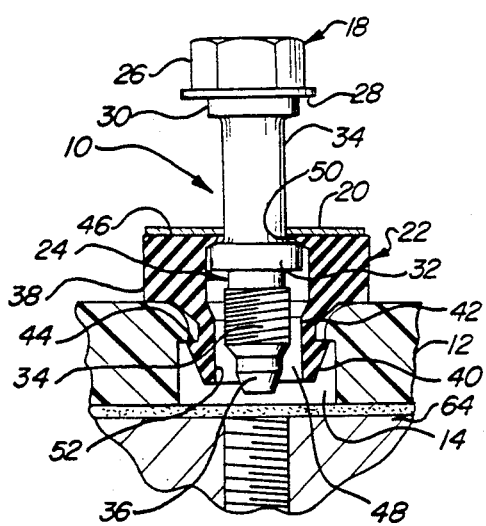
Figure 4:
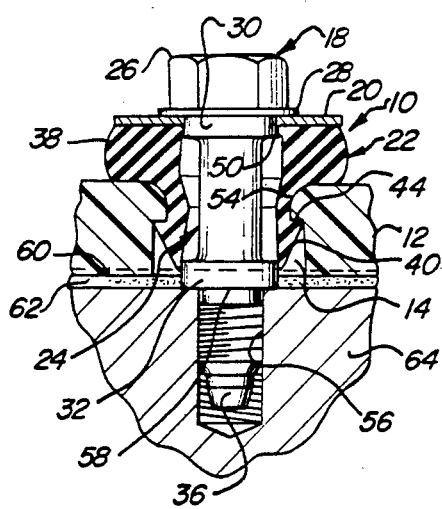

FIG. 3 is a cross-sectional view similar to FIG. 2 but showing the bolt in its outwardly extending position as it would be as the cover is placed on a second apertured part, an engine cylinder head, to be joined by the assembly; and FIG. 4 is a cross-sectional view similar to FIGS. 2 and 3 but showing the fastener and grommet assembly with the bolt having been screwed into the engine cylinder head with the lower face of the lower bolt shoulder acting as a torque limiting surface against the face of the engine cylinder head.

Figure 1:
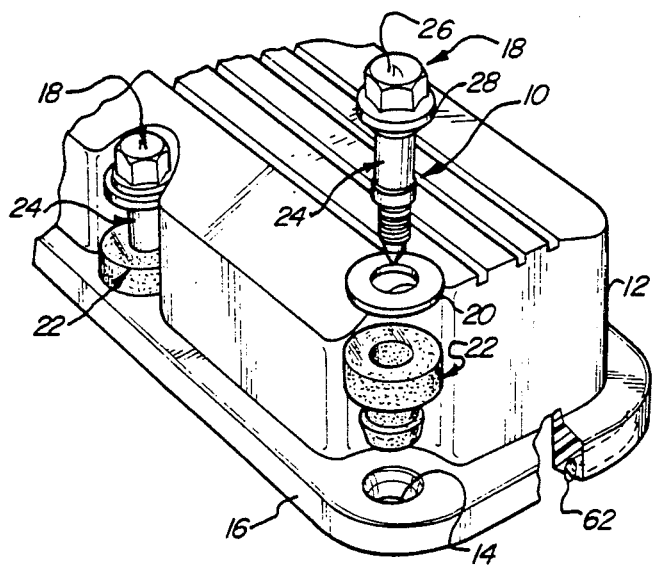
FIG. 1 is a perspective view with one of two fastener and grommet assemblies shown exploded to show the manner in which the fastener is assembled to the grommet and the manner in which the assembly is attached to one of two work pieces or apertured parts to be joined. In this instance a rocker arm cover is shown which will later be joined to an engine cylinder head.

Referring to FIG. 1, the fastener and grommet assembly 10 of the invention is seen being attached to one of two apertured parts 12 to be joined. One of the assemblies 10 has been inserted into an aperture 14 in the flange 16 of the cover, and a second assembly is exploded to show its manner of assembly. The fastener assembly 10 includes a bolt 18, a metal washer 20 and a resilient grommet 22. The bolt shank 24 is inserted through the washer 20 and grommet 22, and the grommet 22 of the assembly is pushed into the aperture 14 of the part to be joined. The bolt 18 has a conventional hexagonal head 26 for tightening by a conventional socket wrench. A bearing surface 28 is located below the head 26. The bolt shank 24 has an upper shoulder 30 below the bearing surface 28 and a lower shoulder 32. The shank has a reduced diameter relief area 34 located between the two shoulders. The shank has threads 34 below the lower shoulder 32 and a reduced diameter end 36 which may be tapered.

The resilient grommet 22 can be molded with a rubber composition. It has an upper cylindrical flange 38 and a lower conical flange 40 joined by a tubular portion 42. Lower flange 40 has an upper radial top surface 44 which extends into the tubular portion 42. The upper flange 38 has a free radial face 46 against which the washer 20 seats. The grommet has through-hole 48 and an inwardly directed sealing bead 50 adjacent to the top radial surface 46. The through-hole 48 has a reduced diameter 52 at the lower end adjacent to lower flange 40.

The lower bolt shoudler 32 has a larger diameter than the diameter of sealing bead 50 or an interference fit exists between shoulder 32 and bead 50. When the bolt shank 24 is pushed into through-hole 48 the sealing bead 50 snaps over the shoulder 32. This acts to retain the bolt 18 in the grommet 22 and the fastener and grommet assembly can be shipped in this fashion. Normally the metal washer 20 is inserted over the shank 24 and is retained between the grommet 22 and the bearing surface 28 of the bolt.

The upper portion of the lower grommet flange 40, adjacent to the upper radial surface 44, has a larger diameter than the shoulder diameter 54 in the valve cover aperture 14. Thus, when the fasterner and grommet assembly is pushed into the aperture 14, the lower flange snaps past the reduced diameter shoulder 54 of the cover flange to thereby retain the assembly within the aperture 14. To aid in this retention, particularly during shipment of the rocker arm covers with the assemblies already attached, the lower bolt shoulder diameter 32 is larger than the reduced diameter 52 at the lower end of grommet 22. When the bolt 18 is moved into its fully inserted position as shown in FIG. 2, the lower grommet flange is pushed outwardly into snug contact with the rocker arm cover flange 16. It should be noted, however, that the assembly 10 will be retained in the rocker arm cover even when the cover is dropped onto the engine cylinder head 64 to which it is to be attached, driving the bolt 18 upwardly to its outwardly extending position as shown in FIG. 3. This axial play of the bolt 18 between its outward position shown in FIG. 3 and its inner position as shown in FIGS. 2 and 4, allows the cover to be shipped with the fastener and grommet assemblies 10 attached to the cover, permitting alignment of the bolt with the threaded bolt hole 56 in the engine cylinder head 64.

When the bolts 18 are driven into the engine block 54 by automatic equipment, the lower surface 58 of lower bolt shoulder 32 acts as a torque limiting surface against the top surface 60 of the engine cylinder head so that the bead gasket 62 is properly compressed.

When the bolt 18 is fully inserted into the grommet 22, the bead 50 seals against the upper shoulder 30. This allows the assembly to be used not only where the bolt is outside of the sealing bead as shown, but also where the sealing bead or gasket is outside of the perimeter of the fasteners.

Typically, the bolt may have a upper shoulder with a diameter of 8 milimeters and a lower shoulder of 9 milimeters with an intermediate reduced relief diameter of 7 milimeters. This bolt would be used with a grommet having a sealing bead diameter of 7.5 milimeters and a lower reduced diameter of 8.3 milimeters. With this arrangement, the grommet bead 50 will seal against the upper bolt shoulder 30 and the lower bolt shoulder 32 will force the lower grommet flange 40 outwardly. At the same time, the clearance between the inside diameter of 7.5 milimeters for the grommet bead and the 7 milimeter reduced diameter shank will allow the bolt 18 to be easily moved between its fully inserted position shown in FIG. 2 to its outward position shown in FIG. 3.

It will be readily apparent that while the fastener and grommet assembly of this invention has been shown to be used in conjunction with the fastening of an automotive engine rocker arm cover to the engine cylinder head, that many other applications may be made. In the automotive field, this type of arrangement can also be used to secure the oil pan to the engine block, and various other components.

The embodiments of the invention in which an exclusive property or privilege is claimed are defined as follows:

1. A fastener and grommet assembly providing axial play for assembling apertured parts comprising:
    a bolt having:
        a head;
        a bearing surface below said head; and
        a shank having an upper and a lower spaced shoulder and a reduced diameter relief area therebetween, said upper shoulder being adjacent said bearing surface;
        said shank having a threaded portion below said lower shoulder, and;
    a resilient grommet having:
        an upper and a lower spaced flange and an intermediate tubular portion interconnecting said flanges;
        a through-hole in said grommet receiving the shank of said bolt therethrough;
        said upper flange having a free radial face coacting with said bolt bearing surface;
        a flat washer located on said bolt shank between said bearing surface and the free radial face of said grommet upper flange;
        a sealing ring adjacent said radial face projecting inwardly in said through-hole and sealing against said upper shoulder when said bolt is fully inserted in said grommet;
        said lower shoulder having an outside diameter larger than the inside diameter of said sealing ring so that the lower shoulder must be forced past the sealing ring as the bolt is being inserted into the grommet, the coaction of said lower flange and said sealing ring acting as a stop, retaining said bolt in said grommet;
        the inner diameter of said sealing ring being larger than the reduced diameter of said relief area allowing substantial axial play between said bolt and said grommet; and
        said through-hole having a reduced diameter adjacent its lower end creating an interference fit with the lower shoulder so that when said fastener and grommet assembly is inserted into an aperture on a wall of an apertured part, said wall will be located on said tubular portion between said upper and lower flanges of the grommet, and when the bolt is fully inserted into the grommet, the lower shoulder will expand the lower flange of the grommet outwardly to enhance retention of the assembly on the apertured part.

2. The fastener and grommet assembly according to claim 1 wherein said upper and lower flanges are circumferentially continuous.

3. The fastener and grommet assembly according to claim 2 wherein said lower flange has a radial top surface extending from the outer perimeter of said flange towards said tubular portion, and said flange further has an exterior surface tapering from the outer perimeter of the flange inwardly to a free end of said flange, the tapering exterior surface of the lower flange aiding insertion of the assembly into the aperture of said apertured part.

4. The fastener and grommet assembly according to claim 3 wherein the lower bolt shoulder has a lower radial face which is spaced a selected distance from said bearing surface and the thickness of said washer is selected so that when said apertured part is being joined to a second part having threaded apertures by driving said bolt into said threaded aperture, said lower radial face will act as a torque limiting surface.

5. A fastener and grommet assembly providing axial play for assembling apertured parts comprising:
    a bolt having:
        a head;
        a bearing surface below said head; and
        a shank having an upper and a lower spaced shoulder and a reduced diameter relief area therebetween, said upper shoulder being adjacent said bearing surface;
        said shank having a threaded portion below said lower shoulder, and;
    a resilient grommet having:
        an upper and a lower spaced flange and an intermediate tubular portion interconnecting said flanges;
        said upper flange having a free radial face;
        a through-hole in said grommet receiving the shank of said bolt therethrough;
        a sealing ring adjacent said radial face projecting inwardly in said through-hole and sealing against said upper shoulder when said bolt is fully inserted in said grommet;
        said lower shoulder having an interference fit with said through-hole at said lower flange to expand said lower flange outwardly so as to retain said fastener and grommet assembly on an apertured part on said tubular portion between said upper and lower flanges when said grommet is inserted into the aperture of a apertured part and said bolt is fully inserted in said grommet;
        said lower shoulder having an outside diameter larger than the inside diameter of said sealing ring so that said lower shoulder must be forced past said sealing ring as said bolt is being inserted into said grommet, the coaction of said lower shoulder and said sealing ring acting as a stop, retaining said bolt in said grommet;
        the inner diameter of said sealing ring being larger than the reduced diameter of said relief area allowing substantial axial play between said bolt and said grommet, said upper flange having a free radial face; and
        a flat washer located on said bolt shank between said bearing surface and the free radial face of said grommet upper flange.

6. A fastener and grommet assembly providing axial play for assembling apertured parts comprising:
   a bolt having:
   a head;
   a bearing surface below said head; and
   a shank having an upper and a lower spaced shoulder and a reduced diameter relief area therebetween, said upper shoulder being adjacent said bearing surface;
   said shank having a threaded portion below said lower shoulder, and;
   a resilient grommet having:
   an upper and a lower spaced flange and an intermediate tubular portion interconnecting said flanges;
   said upper flange having a free radial face;
   a through-hole in said grommet receiving said shank of said bolt therethrough;
   a bead adjacent said radial face projecting inwardly in said through-hole;
   said lower shoulder having an outside diameter larger than the inside diameter of said bead so that said lower shoulder must be forced past said bead as said bolt is being inserted into said grommet, the coaction of said lower shoulder and said bead acting as a stop, retaining said bolt in said grommet;
   said lower shoulder having an interference fit with said through-hole at said lower flange to expand said lower flange outwardly so as to retain said fastener and grommet assembly on an apertured part on said tubular portion between said upper and lower flanges when said grommet is inserted into the aperture of an apertured part and said bolt is fully inserted into said grommet;
   the inner diameter of said bead being larger than the reduced diameter of said relief area; and
   a flat washer located on said bolt shank between said bearing surface and the free radical face of said grommet upper flange;
   whereby substantial axial play is provided between said grommet and bolt for alignment of said apertured parts being joined, said play being defined between a position where said bearing surface is in contact with said washer and an extended position where said lower flange contacts said bead.

7. The fastener and grommet assembly according to claim 6 wherein said bolt shank has a reduced diameter portion below said threads.

* * * * *